UNITED STATES PATENT OFFICE.

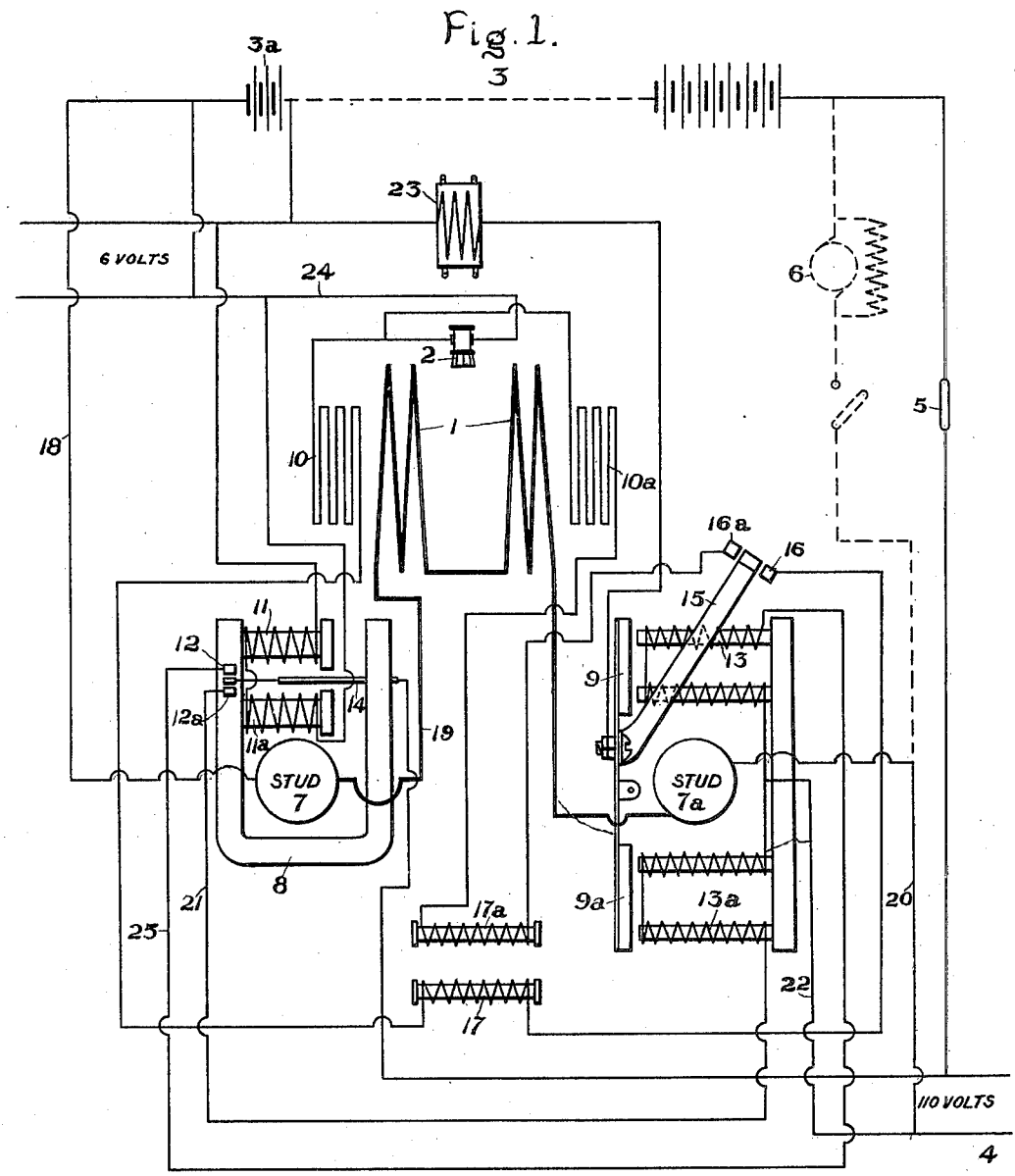

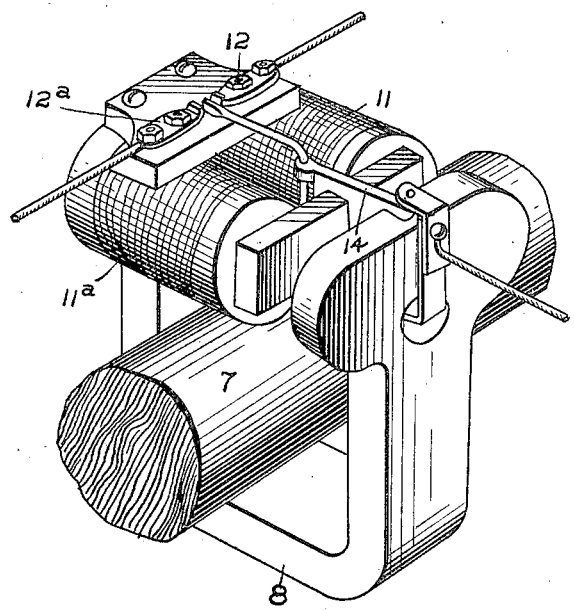

WILLIAM H. PRATT, OF LYNN, MASSACHUSETTS, ASSIGNOR TO GENERAL ELECTRIC COMPANY, OF NEW YORK.

ELECTRIC METER.

SPECIFICATION forming part of Letters Patent No. 679,333, dated July 30, 1901.

Application filed April 22, 1901. Serial No. 56,804. (No model.)

*To all whom it may concern:*

Be it known that I, WILLIAM H. PRATT, a citizen of the United States, residing at Lynn, in the county of Essex, State of Massachusetts, have invented certain new and useful Improvements in Electric Meters, (Case No. 2,082,) of which the following is a specification.

In meters employed to register the energy consumed in circuits including a storage battery it is desirable to provide for forward or backward movement, so as to indicate on a single dial the condition of the battery from time to time. With meters of the Thomson recording-wattmeter type, in which an auxiliary starting-coil is employed in the field to compensate for errors due to starting friction, means have been heretofore provided for changing the circuit connections with relation to two or more starting-coils, so as to compensate for this friction in either direction of operation of the motor. My invention relates to meters of this type; and it consists of a polarized controlling device responsive to the work-current in the circuit controlling the meter for governing this starting friction, so as to insure accuracy of the record.

In carrying out the invention I provide a polarized relay under the control of the work-current and an electromagnetic switch for governing the direction of assistance of the starting-coil. The relay comprises a magnetic circuit, for which the magnetizing-current is furnished by the work-current, and which therefore reverses its polarity with the reversal of direction, accordingly as the storage battery is charging or discharging, and is provided on its pole-pieces with an opposing winding, giving a constant direction of magnetization. This winding may be excited by a shunt-circuit from a part of the storage battery, if desired.

The novel features of the invention will be hereinafter more fully described, and will be definitely indicated in the claims appended to this specification.

In the accompanying drawings, Figure 1 shows diagrammatically a system of meter connections embodying my improvements. Fig. 2 is a perspective view of a polarized controlling device.

1 represents the series coils, and 2 the armature, of a meter-motor—such, for example, as commonly employed in Thomson recording-wattmeters, in which the armature is or may be excited by a potential circuit and a field coöperating with the armature by a few turns in series with the work-current.

3 represents a storage battery, the amount of residual energy in which it is desired to indicate.

4 represents a supply-circuit for the battery, which may be controlled by a hand-operated or automatic switch, (typically indicated at 5.)

6 represents a motor, which might of course be any other type of translating device or devices fed by the storage battery.

In series relation to the battery are the series coils 1, which are fed through heavy copper studs 7 $7^a$. The stud 7, as indicated in the diagram, passes through the iron core 8, and the magnetic field developed by this partial turn of the stud which threads the magnetic circuit acts to polarize the core 8. The stud 7 furnishes magnetizing-current for a core 8 of a magnetic device controlling the friction compensating coils. This friction is regulated by coils 10 $10^a$, one of which is wound in a direction to assist movement of the meter-motor in one direction and the other movement in the opposite direction.

The magnetic controlling devices may be of any approved construction. That shown comprises two iron pole-pieces, as 11 $11^a$, secured to one leg of the core of the instrument, between which plays an armature polarized by the other leg, which acts as a relay-tongue to cut into circuit one or the other of the two contacts 12 $12^a$. One of these contacts connects with the polarizing-coils 13 of a switch-magnet. The other contact $12^a$ connects in like manner with the polarizing-coils $13^a$ of a companion switch-magnet.

9 $9^a$ are armatures coöperating with the coils 13 $11^a$. The other terminals of the coil systems 13 $13^a$ connect in parallel with one of the circuit-mains, the relay-tongue 14 being connected with the other circuit-main. The coils 11 $11^a$ are fed by a small group of cells from the storage battery. The starting-coils 10 $10^a$ are connected to the potential circuit in which the armature is included, and this may be derived from a small group of cells of the battery. The magnetic switch operated by the relay shifts a lever 15 and completes connection with a contact 16 or 16$^a$, one of which is in series relation to the coil 10 through a resistance 17 and the other with coil 10$^a$ through a resistance 17$^a$.

With this organization the operation of the system is as follows: Assuming the switch 5 to be in the position indicated in the drawings, the battery 3 is being charged from the supply-circuit 4 over a circuit including the switch 5, the battery, wire 18, to one end of the stud 7, through the stud to its other end, and thence to a wire 19 leading to the series field 1, thence to the stud 7$^a$, and by wire 20 to the return side of the supply-circuit. The current passing through the stud 7 will polarize the relay-magnet 8. The coils 11 11$^a$ of the relay, being energized by a shunt-circuit from a section of the storage battery 3$^a$ give a determinate direction of movement to the relay-tongue 14—say downwardly—thereby completing contact with 12$^a$ and putting the supply-circuit on coils 13$^a$ through wire 21 22, thereby throwing the switch 15 to complete connection with contact 16$^a$, and thus completing the armature-circuit of the meter-motor from one terminal of the group of cells 3$^a$ through resistance 23 17$^a$, starting-coil 10$^a$, armature 2, conductor 24, to the other terminal of the group of cells 3$^a$. The motor thus will run in a direction to record the amount of energy absorbed by the storage battery. If the switch 5 is opened and the circuit including the motor 6 or other translating device is closed, the current discharged by the storage battery will pass in a reverse direction through the series field 1 and through the stud 7, thereby giving an opposite polarity to the magnets energized by this stud and shifting the relay-tongue 14 to connect with the upper contact 12, thereby cutting in magnet 13 of the switch for the starting-coils over the path 25, coils 13, and wire 22. The switch 15 will thereby be shifted to engage with contact 16, which cuts the starting-coil 10 into series relation to the armature 2, being wound, as already stated, in a direction to assist the backward movement of the meter-motor. The polarized instrument is responsive to very light currents. Thus the meter-motor runs forward or backward as the battery is charging or discharging, and the meter-dial will indicate the energy in the battery at any time. The meter may be adjusted to run at a different speed in going backward to balance the inefficiency of the battery by giving the resistances 17 17$^a$ different values.

What I claim as new, and desire to secure by Letters Patent of the United States, is—

1. The combination of a translating device and a relay governing its circuit connections, the relay-armature being polarized by a conducting-stud adjacent to its magnet-core in circuit with the translating device.

2. An electric meter for storage batteries having its motor operated by series and potential windings, starting-coils for compensating motor friction in opposite directions of movement, and a polarized relay having a magnetic core polarized by the work-current for cutting into operation the respective starting-coils.

3. A meter provided with means to compensate for friction in opposite directions of motor movement, a relay responsive to reversals of work-current, and a magnetically-operated switch governed by the relay controlling the compensating means.

4. A storage-battery meter provided with starting-coils to compensate for friction in opposite directions of motor movement, a polarized relay controlling the respective coils, and a conducting-stud threading the magnetic circuit of the relay, said stud being connected in the work-circuit.

In witness whereof I have hereunto set my hand this 18th day of April, 1901.

WILLIAM H. PRATT.

Witnesses:
DUGALD McK. McKILLOP,
ALEX. F. MACDONALD.